US 8,089,554 B2
Jan. 3, 2012

(12) United States Patent
Hamano

(10) Patent No.: US 8,089,554 B2
(45) Date of Patent: Jan. 3, 2012

(54) IMAGE CAPTURING APPARATUS, CONTROL METHOD THEREFOR, AND PROGRAM

(75) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 457 days.

(21) Appl. No.: 12/444,099

(22) PCT Filed: Jun. 17, 2008

(86) PCT No.: PCT/JP2008/061387
§ 371 (c)(1),
(2), (4) Date: Apr. 2, 2009

(87) PCT Pub. No.: WO2009/013962
PCT Pub. Date: Jan. 29, 2009

(65) Prior Publication Data
US 2010/0013962 A1    Jan. 21, 2010

(30) Foreign Application Priority Data
Jul. 24, 2007    (JP) .................................. 2007-192650

(51) Int. Cl.
*H04N 5/225*    (2006.01)
*H04N 9/07*    (2006.01)

(52) U.S. Cl. .................................. 348/335; 348/207.99

(58) Field of Classification Search ............. 348/207.99, 348/241, 335, 340; 359/507
See application file for complete search history.

(56) References Cited

U.S. PATENT DOCUMENTS

| 7,006,138 B2 | 2/2006 | Kawai ............................ 348/340 |
| 7,215,372 B2 | 5/2007 | Ito et al. ......................... 348/340 |
| 7,486,326 B2 | 2/2009 | Ito et al. ......................... 348/335 |
| 7,778,542 B2* | 8/2010 | Oshima .......................... 396/236 |
| 2004/0041936 A1 | 3/2004 | Uchiyama ....................... 348/335 |
| 2006/0115177 A1 | 6/2006 | Ishiga ............................. 382/275 |
| 2007/0171295 A1 | 7/2007 | Kawai ............................ 348/340 |
| 2010/0073492 A1* | 3/2010 | Kudo ........................... 348/208.1 |
| 2011/0001837 A1* | 1/2011 | Kotani ....................... 348/208.99 |

FOREIGN PATENT DOCUMENTS

| JP | 2002-204379 A | 7/2002 |
| JP | 2004-222231 A | 8/2004 |
| JP | 2004-222233 A | 8/2004 |
| JP | 2005-072629 A | 3/2005 |

* cited by examiner

*Primary Examiner* — David N Spector
(74) *Attorney, Agent, or Firm* — Fitzpatrick, Cella, Harper & Scinto

(57) ABSTRACT

This invention makes shot image data match dust correction data as much as possible even when the dust adhesion state changes. An image capturing apparatus includes an image capturing unit which photo-electrically converts, by an image sensor, an object image formed by a photographing lens to generate an image signal, a foreign substance information detection unit which detects, based on the image signal, foreign substance information serving as information on at least the position of a foreign substance adhering to an optical element placed in front of the image sensor, and an association unit which associates an image signal with foreign substance information, and associates foreign substance information detected by the foreign substance information detection unit not only with an image signal obtained after detecting the foreign substance information, but also with even an image signal obtained before detecting the foreign substance information.

6 Claims, 9 Drawing Sheets

FIG. 6

| SHOOTING HISTORY WRITE TIME | OPERATION PERFORMED AT THAT TIME |
|---|---|
| 2006/3/20 08:10:43 | ACQUISITION OF DUST CORRECTION DATA A |
| 2006/3/21 16:58:40 | ACQUISITION OF IMAGE 1 |
| 2006/3/21 17:01:10 | ACQUISITION OF IMAGE 2 |
| 2006/3/21 17:05:25 | ACQUISITION OF IMAGE 3 |
| 2006/3/22 12:25:03 | EXECUTION OF STARTING DUST REMOVAL PROCESSING |
| 2006/3/22 12:30:07 | ACQUISITION OF IMAGE 4 |
| 2006/3/22 12:30:08 | ACQUISITION OF IMAGE 5 |
| 2006/3/22 12:30:09 | ACQUISITION OF IMAGE 6 |
| 2006/3/22 12:30:10 | ACQUISITION OF IMAGE 7 |
| 2006/3/22 12:30:11 | ACQUISITION OF IMAGE 8 |
| 2006/3/22 18:48:49 | ACQUISITION OF DUST CORRECTION DATA B |

FIG. 8

| SHOOTING HISTORY WRITE TIME | OPERATION PERFORMED AT THAT TIME |
|---|---|
| 2006/3/20 08:10:43 | ACQUISITION OF DUST CORRECTION DATA C |
| 2006/3/21 16:58:40 | ACQUISITION OF IMAGE 11 |
| 2006/3/21 17:01:10 | ACQUISITION OF IMAGE 12 |
| 2006/3/21 17:05:25 | ACQUISITION OF IMAGE 13 |
| 2006/4/10 12:30:07 | ACQUISITION OF IMAGE 14 |
| 2006/4/10 12:30:08 | ACQUISITION OF IMAGE 15 |
| 2006/4/10 12:30:09 | ACQUISITION OF IMAGE 16 |
| 2006/4/10 12:30:10 | ACQUISITION OF IMAGE 17 |
| 2006/4/10 12:30:11 | ACQUISITION OF IMAGE 18 |
| 2006/4/10 18:48:19 | ACQUISITION OF DUST CORRECTION DATA D |

FIG. 9

| LENS USED IN SHOOTING | OPERATION PERFORMED AT THAT TIME |
|---|---|
| LENS 1(SHOOTING ON 2006/8/9) | ACQUISITION OF DUST CORRECTION DATA E |
| LENS 1(SHOOTING ON 2006/8/9) | ACQUISITION OF IMAGE 21 |
| LENS 1(SHOOTING ON 2006/8/9) | ACQUISITION OF IMAGE 22 |
| LENS 1(SHOOTING ON 2006/8/9) | ACQUISITION OF IMAGE 23 |
| LENS 2(SHOOTING ON 2006/8/9) | ACQUISITION OF IMAGE 24 |
| LENS 2(SHOOTING ON 2006/8/9) | ACQUISITION OF IMAGE 25 |
| LENS 2(SHOOTING ON 2006/8/9) | ACQUISITION OF IMAGE 26 |
| LENS 2(SHOOTING ON 2006/8/9) | ACQUISITION OF IMAGE 27 |
| LENS 2(SHOOTING ON 2006/8/9) | ACQUISITION OF IMAGE 28 |
| LENS 2(SHOOTING ON 2006/8/9) | ACQUISITION OF DUST CORRECTION DATA F |

IMAGE CAPTURING APPARATUS, CONTROL METHOD THEREFOR, AND PROGRAM

The present application is a National-Phase entry of International Application No. PCT/JP2008/061387 filed on Jun. 17, 2008. This application claims the benefit of Japanese Patent Application No. 2007-192650, filed Jul. 24, 2007, which is hereby incorporated by reference herein in its entirety.

TECHNICAL FIELD

The present invention relates to a technique of suppressing degradation of the image quality caused by a foreign substance adhering to the surface of an optical element such as an optical lowpass filter placed in front of an image sensor in an image capturing apparatus using an image sensor such as a CCD, CMOS sensor, or the like.

BACKGROUND ART

In an image capturing apparatus such as a digital camera, a foreign substance such as dust or mote (to be simply referred to as dust hereinafter) sometimes adheres to the surface of an image sensor protective glass fixed to an image sensor, the surface of an optical element placed in front of the image sensor, or an optical system (which will be generically referred to as an image sensor optical component hereinafter). When dust adheres to an image sensor optical component, the dust blocks light, an image at the light-blocked portion is not shot, and the quality of the shot image degrades.

In cameras using silver-halide films as well as digital cameras, dust on a film is also captured in an image. However, the film moves frame by frame, and hence dust is very rarely captured on all frames.

In contrast, the image sensor of the digital camera does not move, and one image sensor shoots an image. Once dust adheres to an image sensor optical component, the dust is captured on many frames (shot images). In particular, a lens-interchangeable digital camera has a problem that dust tends to enter the camera at the time of lens interchange.

The user of the camera therefore must always care about the adhesion of dust to an image sensor optical component, and spends much effort to check and clean dust. Since an image sensor, in particular, is placed relatively deep inside the camera, it is not easy to clean or check dust.

Dust enters a lens-interchangeable digital camera when attaching or detaching a lens. Furthermore, dust easily adheres to an image sensor optical component owing to wear or the like upon driving of a focal plane shutter placed immediately before an image sensor.

Since such dust on the image sensor generally adheres onto a protective glass or optical element instead of the surface of the image sensor, the dust is imaged in different states depending on the aperture value or pupil position of a photographing lens. That is, as the aperture value approaches the open F-number, a shot image blurs, and hence even the adhesion of small dust has almost no influence on the image. In contrast, as the aperture value increases, such dust is clearly imaged, and hence affects the image.

To solve this problem, there is known a method of making dust less noticeable. According to this method, an image of only dust on an image sensor is prepared in advance by shooting a white wall or the like while setting the lens at a large aperture value. This image is used in combination with a general shot image (see Japanese Patent Laid-Open No. 2004-222231).

There is also proposed a technique of vibrating an image sensor optical component to shake off dust adhering to it (see Japanese Patent Laid-Open No. 2002-204379).

It is possible to combine a method of detecting the position of dust on an image sensor to obtain dust correction data in order to correct a shot image portion, and correcting shot image data, as disclosed in Japanese Patent Laid-Open No. 2004-222231, and a method of shaking off dust, as disclosed in Japanese Patent Laid-Open No. 2002-204379. This technique can increase the correction precision because after dust is shaken off and reduced, shot image data containing the dust image is corrected.

However, if dust is shaken off after obtaining dust correction data, a dust adhesion state after shaking off dust does not match dust correction data.

In an image capturing apparatus capable of using an interchangeable lens, dust may newly adhere to the lens at the time of lens interchange. Also in this case, the dust adhesion state does not match dust correction data.

DISCLOSURE OF INVENTION

The present invention has been made to overcome the conventional drawbacks, and has as its object to make shot image data match dust correction data as much as possible even when the dust adhesion state changes.

In order to solve the above problems and achieve the above object, according to the first aspect of the present invention, there is provided an image capturing apparatus characterized by comprising an image capturing unit which photo-electrically converts, by an image sensor, an object image formed by a photographing lens to generate an image signal, a foreign substance information detection unit which detects, based on the image signal, foreign substance information serving as information on at least a position of a foreign substance adhering to an optical element placed in front of the image sensor, and an association unit which associates the foreign substance information detected by the foreign substance information detection unit with the image signal generated by the image capturing unit, wherein the association unit associates foreign substance information with an image signal obtained after detecting the foreign substance information, and when a predetermined condition is satisfied, also associates the foreign substance information with even an image signal obtained before detecting the foreign substance information.

According to the second aspect of the present invention, there is provided a method of controlling an image capturing apparatus having an image sensor for photo-electrically converting an object image, the method characterized by comprising an image capturing step of photo-electrically converting, by the image sensor, an object image formed by a photographing lens to generate an image signal, a foreign substance information detection step of detecting, based on the image signal, foreign substance information serving as information on at least a position of a foreign substance adhering to an optical element placed in front of the image sensor, and an association step of associating the foreign substance information detected in the foreign substance information detection step with the image signal generated in the image capturing step, wherein in the association step, foreign substance information is associated with an image signal obtained after detecting the foreign substance information, and when a predetermined condition is satisfied, also associated with even an image signal obtained before detecting the foreign substance information.

Further features of the present invention will become apparent from the following description of exemplary embodiments with reference to the attached drawings.

BRIEF DESCRIPTION OF DRAWINGS

FIG. 6 is a table for explaining a concrete example of the shooting history according to the first embodiment;

FIG. 8 is a table for explaining a concrete example of the shooting history according to the second embodiment; and FIG. 9 is a table for explaining a concrete example of the shooting history according to the third embodiment.

BEST MODE FOR CARRYING OUT THE INVENTION

Preferred embodiments of the present invention will be described in detail below with reference to the accompanying drawings.

First Embodiment

Figure 1:
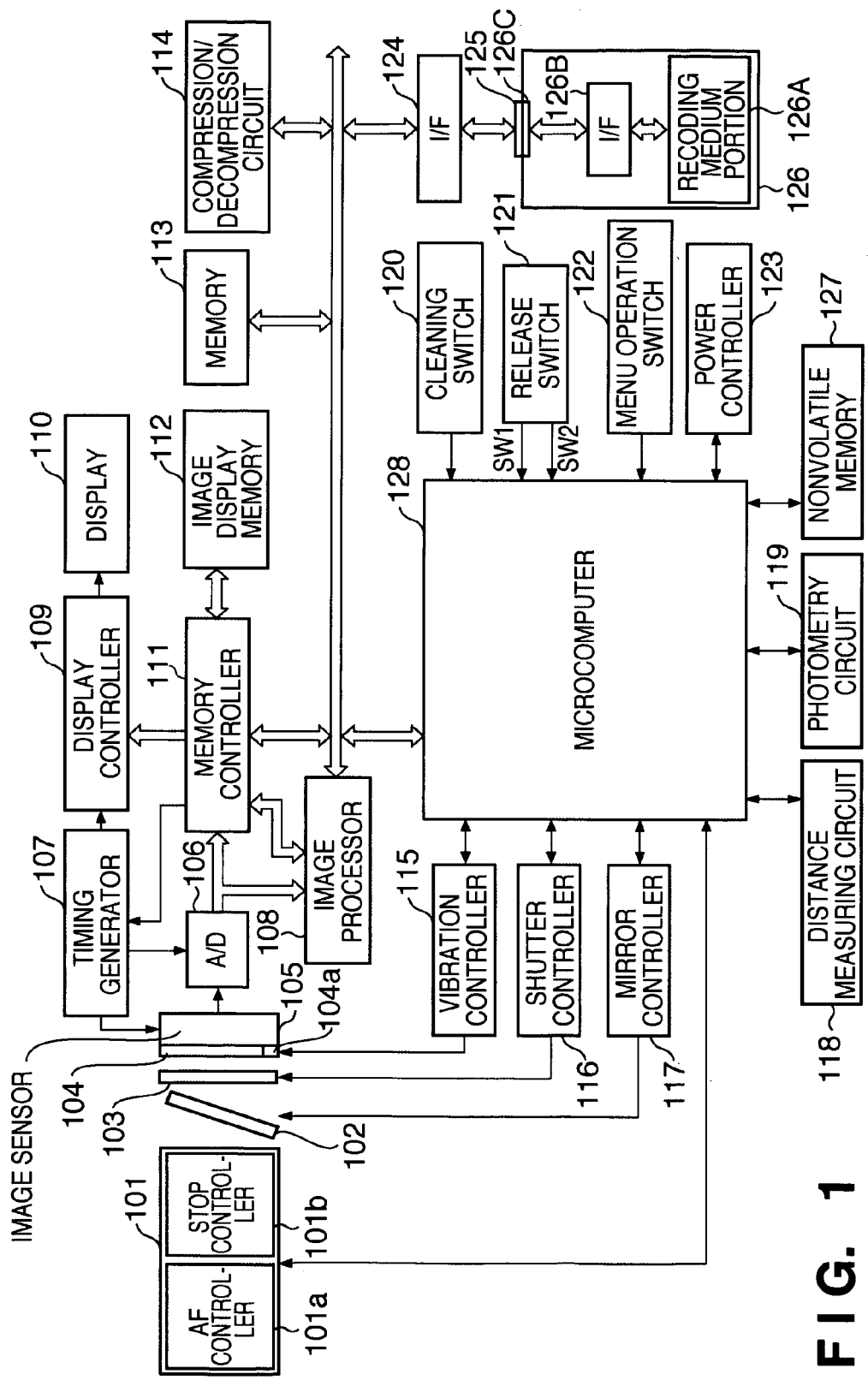
FIG. 1 is a block diagram showing the circuit arrangement of a lens-interchangeable single-lens reflex digital camera serving as an image capturing apparatus according to the first embodiment of the present invention.

FIG. 1 is a block diagram showing the circuit arrangement of a lens-interchangeable single-lens reflex digital camera serving as an image capturing apparatus according to the first embodiment of the present invention.

A lens unit 101 is an interchangeable photographing lens unit including a plurality of lenses. The lens unit 101 communicates with a microcomputer 128 in the camera body, and controls an autofocus (AF) controller 101a in the lens unit 101 to move and focus a focusing lens in the lens unit 101. The lens moving amount at this time is obtained based on an output from a distance measuring circuit 118. The lens unit 101 incorporates a stop controller 101b to change an optical aperture value. A quick return mirror 102 is inserted in a photographing optical path, and can move to a position where the quick return mirror 102 guides object light from the lens unit 101 to a viewfinder optical system (not shown) and a position where it retracts from the photographing optical path. Reference numeral 103 denotes a shutter; and 104, an optical lowpass filter (to be also referred to as an optical element hereinafter) which adjusts the spatial frequency of an object optical image reaching an image sensor 105.

The image sensor 105 photo-electrically converts an object image formed by the lens unit 101 into an image signal. An A/D converter 106 converts the image signal (analog signal) output from the image sensor 105 into a digital signal. A timing generator 107 supplies a clock signal and control signal to the image sensor 105 and A/D converter 106 to operate them. If a foreign substance such as dust or mote adheres to the surface of the optical lowpass filter 104, it is captured in an image generated by the image sensor 105, degrading the image quality. The first embodiment is directed to a technique of correcting an image containing the image of a foreign substance, thereby suppressing degradation of the image quality.

An image processor 108 performs predetermined pixel interpolation processing, development processing, and the like for digital data from the A/D converter 106 or image data from a memory controller 111 on the basis of processing data attached to image data. The memory controller 111 controls the A/D converter 106, the timing generator 107, the image processor 108, a display controller 109, an image display memory 112, a memory 113, a compression/decompression circuit 114, and the like.

Digital data output from the A/D converter 106 is written in the image display memory 112 or memory 113 via the image processor 108 and memory controller 111. A display 110 is formed from a TFT LCD or the like. The display controller 109 controls the display 110 to display image data written for display in the image display memory 112. The memory 113 has an area serving as an image buffer for temporarily storing shot uncompressed image data. The memory 113 has an data used when the image processor 108 performs development processing for image data, holding AF, AE, and AWB calculation results, and storing data for temporary use. Further, the memory 113 has an area serving as a file buffer for storing image data compressed by the compression/decompression circuit 114. The memory 113 has a storage capacity enough to store a predetermined number of still images and a predetermined time of moving image. Even in continuous shooting of continuously shooting still images, a large amount of image data can be quickly written in the memory 113. Note that AF, AE, and AWB stand for auto-focus control, auto-exposure control, and auto-white balance control, respectively.

The compression/decompression circuit 114 compresses image data into JPEG data by adaptive discrete cosine transformation (ADCT), or decompresses compressed image data. The compression/decompression circuit 114 reads image data stored in the memory 113, compresses or decompresses it, and writes the processed data in the memory 113.

A vibration controller 115 controls to drive a piezoelectric element 104a, vibrate the optical element 104, and shake dust off the optical element 104.

A shutter controller 116 controls an operation of the shutter 103.

A mirror controller 117 controls to drive the quick return mirror 102 to outside the photographing optical path.

The distance measuring circuit 118 measures the distance from an object. Based on the measurement result, the AF controller 101a executes focusing control of the lens unit 101.

A photometry circuit 119 measures the brightness of an object, and controls the exposure on the basis of the measurement output.

The microcomputer 128 controls the operation of the digital camera having the above-described arrangement. A nonvolatile memory 127 stores various programs such as a shooting processing program, an image processing program, and a program for recording image file data on a recording medium. These programs are executed by the microcomputer 128. The nonvolatile memory 127 also stores various programs such as an OS for implementing and executing the multitasking operation of these programs, and adjustment values for performing various control operations.

Operation members will be explained. Operation members 120, 121, and 122 are used to input various operation instructions to the microcomputer 128, and are formed from switches or dials. These operation members will be explained in detail.

The cleaning switch 120 is used to designate a dust removal operation (foreign substance removal operation: to be described later). The release switch 121 has a switch SW1 which is turned on by pressing the release button halfway and designates the start of a shooting preparation operation such as AF (Auto Focus) processing and AE (Auto Exposure) processing, and a switch SW2 which is turned on by pressing the release button fully. When the switch SW2 is turned on, shooting processing is executed to write a signal read out from the image sensor 105 in the memory 113 via the A/D converter 106 and memory controller 111. Also, the image processor 108 is used to perform white balance correction processing corresponding to a white balance mode set for image data, and development processing. Further, recording processing is done to read out image data having undergone development processing from the memory 113, compress the image data by the compression/decompression circuit 114, and write the compressed image data in a recording medium 126. The menu operation switch 122 has a combination of a menu key, set key, four-way selector key, and the like. While checking the display 110, the user can use the menu operation switch 122 to change various settings such as camera shooting conditions and development conditions, or select dust detection processing.

A power controller 123 includes a battery detector, a DC-DC converter, and a switching circuit for switching a block to be energized. The power controller 123 detects whether or not the batter is mounted, the type of battery, and the remaining battery level. Based on the detection results, or an instruction from the microcomputer 128, the power controller 123 controls the DC-DC converter to supply a necessary voltage to respective units including a recording medium for a necessary period. An interface (I/F) 124 interfaces the recording medium 126 such as a memory card or hard disk. A connector 125 connects the recording medium 126 such as a memory or hard disk to the interface 124. The recording medium 126 is a memory card, hard disk, or the like, and has a recoding medium portion 126A formed from a semiconductor memory, magnetic disk, or the like, an interface (I/F) 126B with the digital camera, and a connector 126C.

In the embodiment, the numbers of interfaces 124 and connectors 125 for connecting the recording medium 126 are one each. However, the numbers of interfaces and connectors for connecting the recording medium 126 are arbitrary such as one interface and one connector or pluralities of interfaces and connectors. It is also possible to combine interfaces and connectors of different standards.

The operation of the digital camera having the above-described arrangement will be explained with reference to flowcharts.

Figure 2:
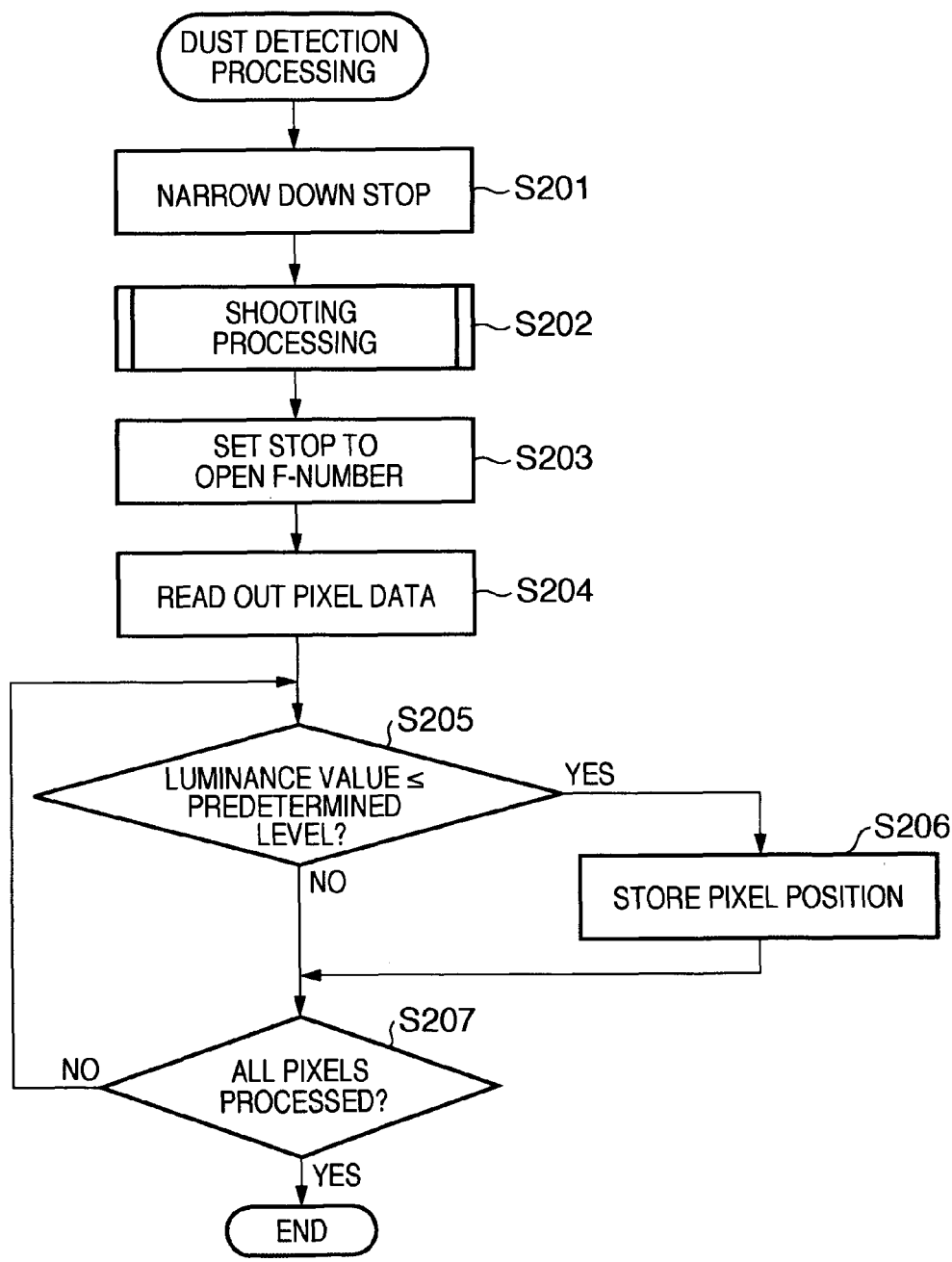
FIG. 2 is a flowchart for explaining processing to detect dust in the digital camera according to the first embodiment.

FIG. 2 is a flowchart for explaining processing to detect dust (foreign substance information) in the digital camera according to the first embodiment. A program for executing this processing is stored in the nonvolatile memory 127, and executed under the control of the microcomputer 128.

The dust detection processing (foreign substance information detection processing) is to detect dust adhering to the optical element 104, as described above, and is executed upon shooting a dust detection image. When performing the dust detection processing, preparations for dust detection are made by aiming the camera at a uniform luminance surface such as the exit surface of a surface light source. Although the embodiment uses a general photographing lens, an illumination means for illuminating an image sensor may also be incorporated in the camera body to illuminate the image sensor at a uniform luminance and detect dust. A dust detection image according to the embodiment is an image having a uniform luminance.

The process shown in the flowchart of FIG. 2 starts when the user operates the menu operation switch 122, and selects and designates the start of dust detection processing from the menu.

In step S201, the microcomputer 128 communicates with the lens unit 101, instructs the stop controller 101b on a stop control value, and narrows down the stop to a predetermined aperture value. The set aperture value is a minimum aperture value (e.g., F32) for dust detection. After the stop is narrowed down, the microcomputer 128 advances to step S202 to execute shooting processing. Details of the shooting processing in step S202 will be described in detail later with reference to FIG. 3.

The memory 113 temporarily stores image data obtained in step S202. After the shooting processing ends, the microcomputer 128 advances to step S203, and controls the stop controller 101b to set the stop of the lens unit 101 to the open F-number.

Then, the microcomputer 128 advances to step S204 to sequentially read out data corresponding to the positions of respective pixels out of the shot image stored in the memory 113, and supply the readout data to the image processor 108. In step S205, the image processor 108 compares the luminance value of the readout pixel data with a preset threshold (preset luminance value).

If dust adheres to the optical element 104, the quantity of light entering a pixel corresponding to the dust adhesion position decreases. Hence, by comparing each pixel data with a preset threshold, the position of a pixel at which an image error occurs owing to the adhesion of dust can be detected. If a pixel position of a signal level equal to or lower than the threshold is detected in step S205, the pixel position is stored in the memory 113 (step S206).

If the microcomputer 128 determines in step S207 that all pixel data have been processed, the memory 113 stores pixel positions determined to have dust. The pixel positions stored in the memory 113 are registered as dust correction data in the nonvolatile memory 127 together with the acquisition date and time of the dust correction data. Every time dust correction data is acquired, it is registered in the nonvolatile memory 127. That is, the image capturing apparatus according to the embodiment can hold a plurality of dust correction data. Association of registered dust correction data with a shot image signal will be described in detail later.

Details of shooting processing will be explained with reference to the flowchart shown in FIG. 3.

Figure 3:
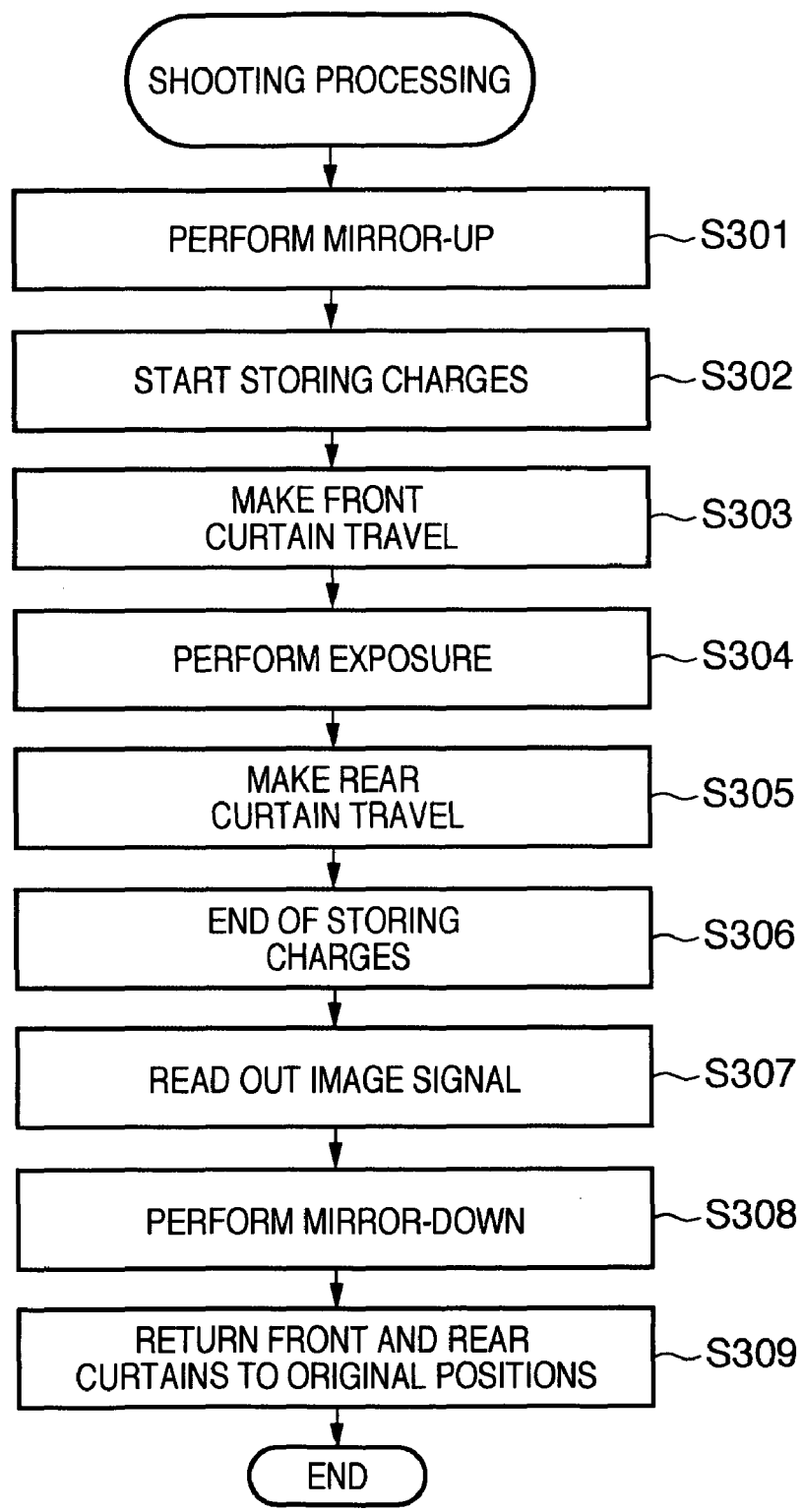
FIG. 3 is a flowchart for explaining shooting processing in the digital camera according to the first embodiment.

FIG. 3 is a flowchart for explaining shooting processing in the digital camera according to the first embodiment. A program for executing this processing is stored in the nonvolatile memory 127, and executed under the control of the microcomputer 128.

When the switch SW1 is turned on, the microcomputer 128 performs autofocus control using the distance measuring circuit 118 and AF controller 101a, and controls the focusing lens to an in-focus position. At the same time, the microcomputer 128 performs a photometry operation using the photometry circuit 119, and determines a shutter control value and aperture value in accordance with a set shooting mode. After these operations end, the microcomputer 128 executes the shooting processing routine in FIG. 3.

In step S301, the microcomputer 128 instructs the mirror controller 117 to execute a so-called mirror-up operation of retracting the quick return mirror 102 from the photographing optical path.

In step S302, the microcomputer 128 starts storing charges in the image sensor 105. The microcomputer 128 instructs in step S303 the shutter controller 116 to make the front curtain of the shutter travel, and performs exposure in step S304.

In step S305, the microcomputer 128 instructs the shutter controller 116 to make the rear curtain of the shutter to travel.

In step S306, the microcomputer 128 ends the storage of charges in the image sensor 105.

In step S307, the microcomputer 128 reads out an image signal from the image sensor 105, and temporarily stores, in the memory 113, image data processed by the A/D converter 106 and image processor 108. After all image signals are read out from the image sensor 105, the microcomputer 128 advances to step S308 to execute a mirror-down operation of returning the quick return mirror 102 to the photographing optical path.

In step S309, the microcomputer 128 instructs the shutter controller 116 to return the front and rear curtains to original standby positions, and ends a series of shooting operations.

Foreign substance removal processing (to be referred to as dust removal processing hereinafter) of physically removing adhering dust from the optical element 104 will be explained.

In the embodiment, a mode for executing processing to remove dust will be called a cleaning mode. When the cleaning mode is executed, the microcomputer 128 instructs the vibration controller 115 to vibrate the piezoelectric element 104a, i.e., the optical element 104 and shake off dust adhering to the surface of the optical element 104. The timing to execute the cleaning mode is properly set by the system design. In the embodiment, the cleaning mode starts when the user operates the cleaning switch 120.

When the cleaning mode is executed to end the dust removal processing, the microcomputer 128 records, in the nonvolatile memory 127, the history including the dust removal processing execution date and time and the driving time.

Association of dust correction data with a shot image, i.e., a method of selecting dust correction data effective for each shot image will be explained.

Association of dust correction data with a shot image is executed after shooting of a general image and after acquisition of dust correction data. Association (first association processing) after shooting of a general image will be described first.

Figure 4:
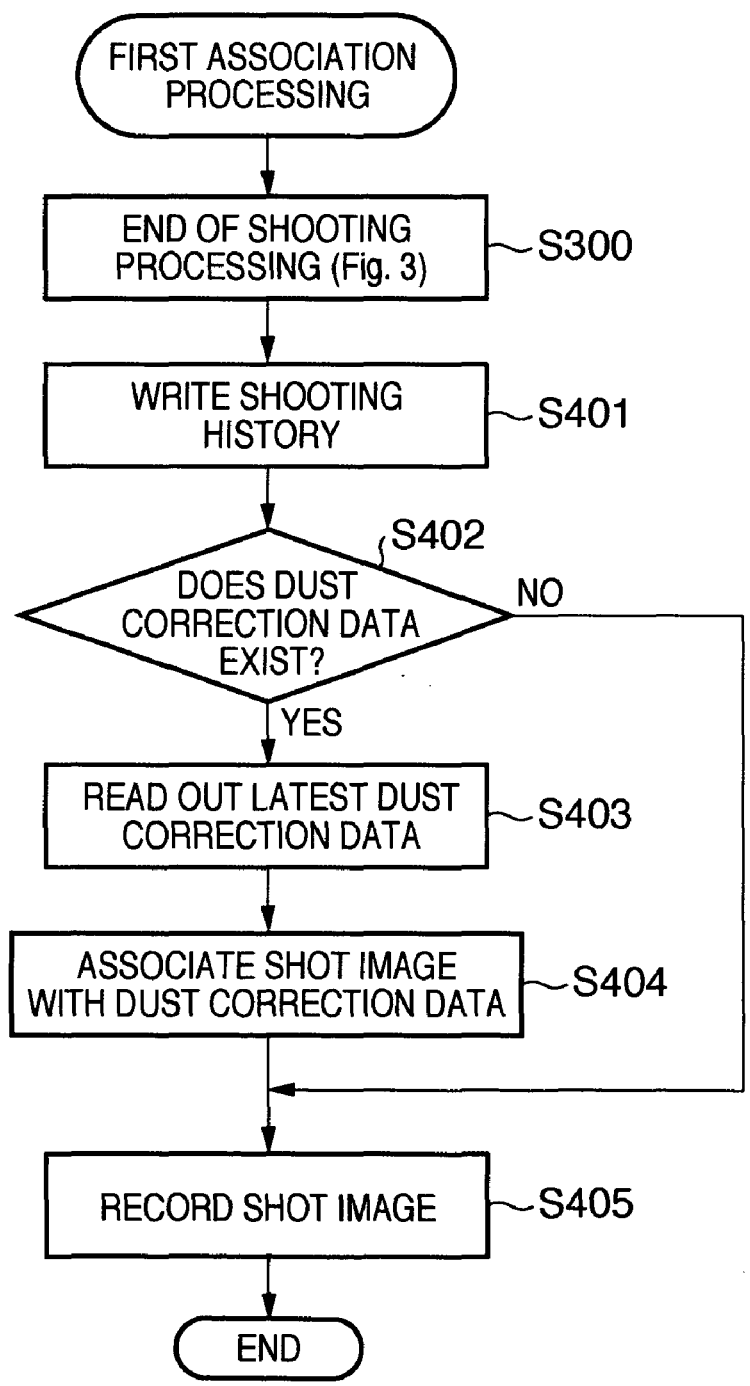
FIG. 4 is a flowchart for explaining the first association processing according to the first embodiment.

FIG. 4 is a flowchart for explaining association after shooting of a general image. A program for executing this processing is stored in the nonvolatile memory 127, and executed under the control of the microcomputer 128.

After shooting processing (step S300) described with reference to FIG. 3 ends, the microcomputer 128 records the shot image acquisition date and time as the shooting history in the nonvolatile memory 127 in step S401. How to use the recorded shot image acquisition date and time will be described later. In step S402, the microcomputer 128 determines whether dust correction data exists in the nonvolatile memory 127. If no dust correction data exists (NO in step S402), no dust correction data can be associated with a shot image. Thus, the microcomputer 128 directly records a shot image in step S405, and ends the sequence of the association processing.

If dust correction data exists in the nonvolatile memory 127 (YES in step S402), the microcomputer 128 advances to step S403 to read out, among at least one dust correction data, dust correction data whose acquisition date and time are closest to the image shooting date and time, i.e., read out the latest dust correction data. In step S403, the microcomputer 128 associates a shot image with the dust correction data. More specifically, this association can be achieved by additionally writing dust correction data in the Exif area serving as the header area of an image file where camera setting values and the like in shooting are recorded. The association can also be achieved by independently recording dust correction data as a file, and recording, in image data, only link information to the dust correction data file. If, however, an image file and dust correction data file are separately recorded, the link may be lost when the image file is moved. Thus, dust correction data and image data are desirably held together. In step S405, the microcomputer 128 records the shot image on the recording medium 126, and ends a series of first association operations upon image shooting.

When a plurality of dust correction data are held upon image shooting, a shot image is associated with the latest dust correction data in the above-described way. The shot image can, therefore, be associated with data which is almost free from a change of the dust adhesion state over time and is most effective for dust correction.

Next, association (second association processing) after acquisition of dust correction data will be described.

Figure 5:
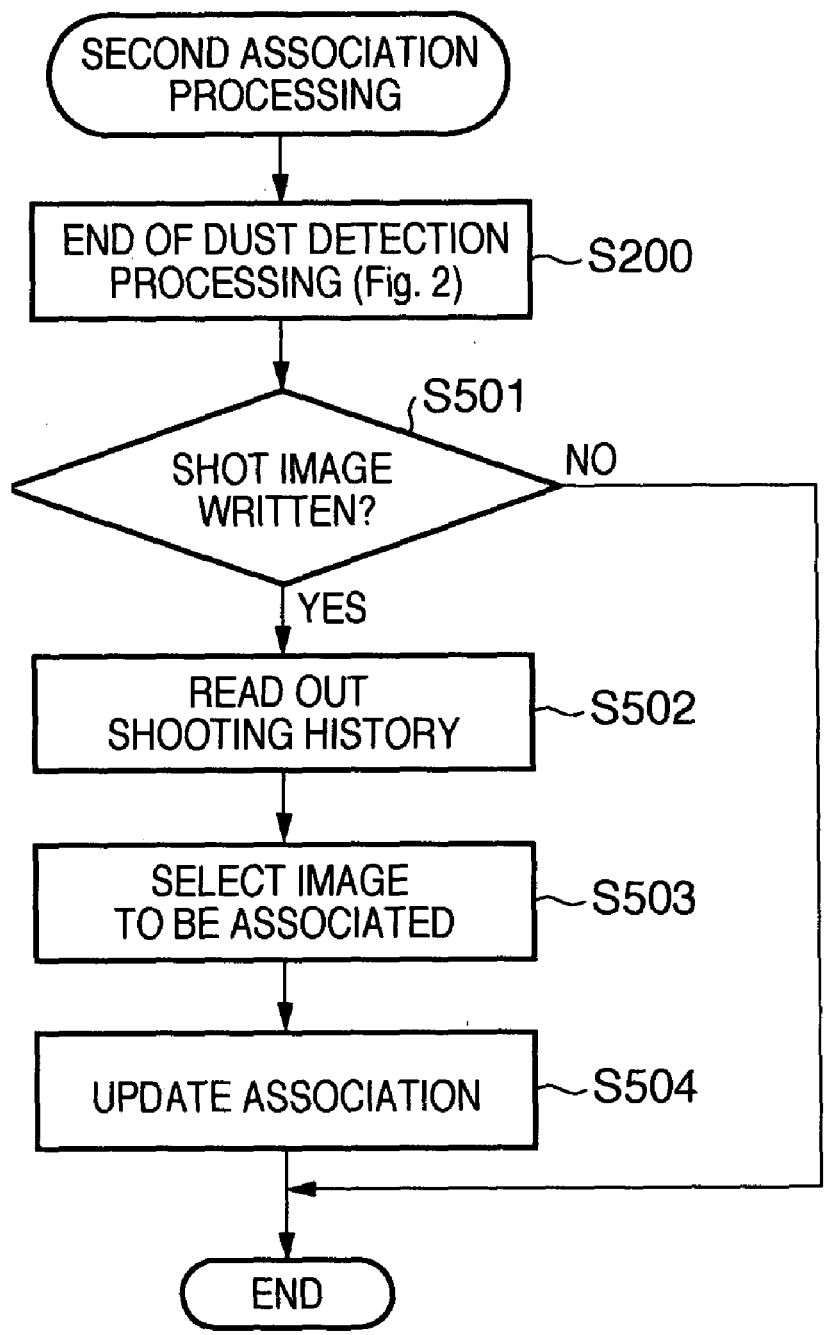
FIG. 5 is a flowchart for explaining the second association processing according to the first embodiment.

FIG. 5 is a flowchart for explaining association after acquisition of dust correction data. A program for executing this processing is stored in the nonvolatile memory 127, and executed under the control of the microcomputer 128.

After dust detection processing (step S200) described with reference to FIG. 2 ends and dust correction data is recorded in the nonvolatile memory 127, the microcomputer 128 determines in step S501 whether a shot image has been written in the recording medium 126. If no shot image has been written in the recording medium 126 (NO in step S501), there is no image to be associated with the dust correction data acquired in step S200, so the second association processing ends. If a shot image has been written in the recording medium 126 (YES in step S501), the microcomputer 128 advances to step S502. In step S502, the microcomputer 128 reads out the shooting history recorded in the nonvolatile memory 127. As described above, the recorded shooting history includes the shooting date and time of a shot image, the date and time when dust removal processing was done, and the type of photographing lens used in shooting.

FIG. 6 shows an example of the shooting history recorded in the nonvolatile memory 127.

In FIG. 6, dust correction data B is the dust correction data acquired in step S200. In step S502, the microcomputer 128 reads out the shooting history up to the date and time when the latest acquired dust correction data except for dust correction data B, i.e., dust correction data A in FIG. 6 was acquired. If there is no dust correction data acquisition history before dust correction data B, the entire shooting history before acquisition of dust correction data B is read out.

In step S503, an image to be associated is selected. In the example of FIG. 6, image 1 to image 8 can be targets of association with dust correction data B, but dust removal processing has been executed between shooting of image 3 and that of image 4. Hence, it is determined that the dust adhesion state is highly likely to have changed between images shot before shooting of image 3 and those shot before shooting of image 4. Dust correction data B is acquired without executing dust removal processing after acquiring image 4. It is estimated that as for the dust adhesion state of image 1 to image 3, dust information of dust correction data A is more reliable than that of dust correction data B, and as for the dust adhesion state of image 4 to image 8, dust information of dust correction data B is more reliable than that of dust correction data A. That is, as for image 4 to image 8, it is considered that dust correction can be done more effectively using the dust detection result of dust correction data B. For this reason, in the example of FIG. 6, image 4 to image 8 are selected in step S503.

In step S504, the microcomputer 128 checks that the selected images are recorded on the recording medium 126, and updates dust correction data associated with the recorded images.

In the example of FIG. 6, dust correction data A is associated with image 1 to image 8 by the first association processing (FIG. 4) until dust correction data B is acquired. When image 4 to image 8 have been recorded on the recording medium, the dust correction data associated with these images is updated from dust correction data A to dust correction data B.

In this manner, according to the first embodiment, a shot image is associated with dust correction data predicted to have a higher correction effect in accordance with the operation history of the dust removal means (the piezoelectric element 104*a*). As a result, dust correction can be performed at high precision without forcing the user of the image capturing apparatus to perform a troublesome operation of selecting dust correction data to be applied to a shot image. Even if dust correction data is acquired after image shooting, high-precision dust correction can be achieved.

In the first embodiment, in step S502, the shooting history is read out up to acquisition of the latest dust correction data, but may also be read out up to an image of the oldest shooting date and time out of images recorded on the recording medium 126.

Dust correction processing (dust correction processing for a general shot image) in general shooting in the digital camera according to the first embodiment will be explained.

Dust correction processing for a shot image may also be performed by the image processor 108 inside the digital camera or an image processing apparatus outside the digital camera. When an external image processing apparatus performs dust correction data, the processing is done as follows. By the processes described with reference to FIGS. 4 and 5, dust correction data is additionally written in, e.g., the Exif area serving as the header area of an image file on the recording medium 126. That is, optimum dust correction data is recorded as an image file on the recording medium 126 while being associated with (attached to) shot image data. By transferring an image file containing shot image data and corresponding dust correction data from the recording medium 126 to the external image processing apparatus, the external image processing apparatus can execute dust correction processing similarly to the image processor 108 inside the digital camera. The external image processing apparatus may also be formed as an apparatus having a processor identical to the image processor inside the digital camera, or implemented by operating application software on a personal computer.

Figure 7:
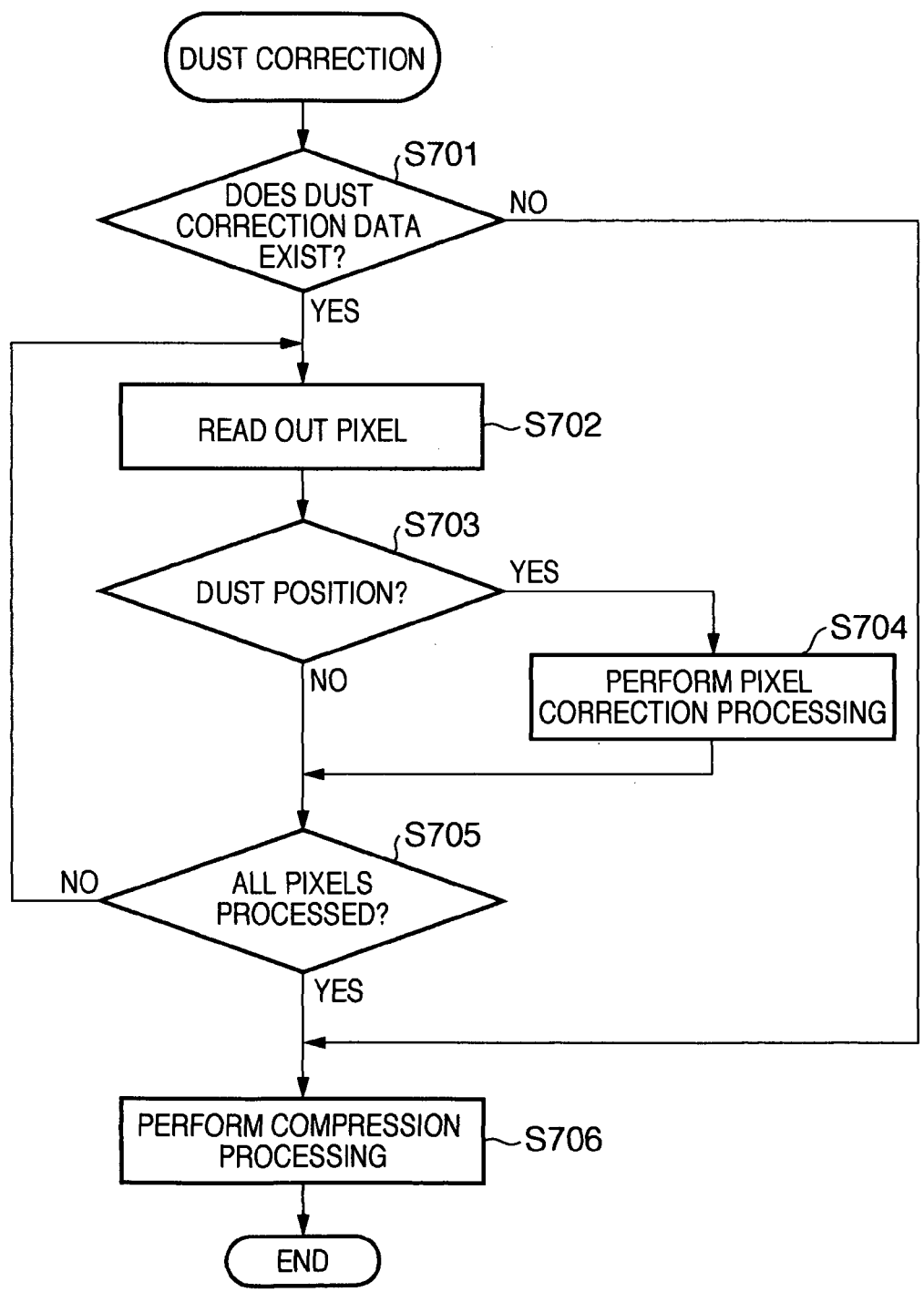
FIG. 7 is a flowchart for explaining dust correction processing according to the first embodiment.

FIG. 7 is a flowchart for explaining dust correction processing executed for shot image data according to the first embodiment.

In step S701, it is checked whether dust correction data for correcting shot image data is attached to image data. In addition to determining whether dust correction data exists, it is also determined whether to apply the dust correction data to shot image data even if dust correction data exists. This determination may also be made automatically by the image capturing apparatus or image processing apparatus, or made by the user.

If it is determined in step S701 that no dust correction data is attached, the process advances to step S706.

If it is determined in step S701 that dust correction data is attached, the process advances to step S702 to sequentially read out pixel data of shot image data. In step S703, the pixel position of readout pixel data is compared with a pixel address registered as dust correction data. If the pixel position coincides with the address (position), it is determined that the pixel data corresponds to a pixel position where dust has been detected.

The process advances to step S704 to correct the readout pixel data by the image processor, and to step S705. This correction processing can adopt a variety of methods, and in the first embodiment, pixel data corresponding to the dust position is obtained by interpolation using peripheral normal pixel data.

If it is determined in step S703 that the pixel data does not correspond to the pixel position where dust has been detected, the process advances to step S705.

In step S705, it is determined whether all pixel data of the shot image data have been verified and interpolated. If it is determined that unprocessed image data remains, the process returns to step S702 to perform the above-described processing for the unprocessed pixel data.

If it is determined in step S705 that all pixel data have been read out and processed, this means that the dust correction processing is complete for shot image data of one shot image.

In step S706, the image processor performs the remaining image processing such as compression processing for the processed image data, thereby completing a series of dust correction operations.

One dust correction data is associated with one image in the first embodiment, but a plurality of dust correction data may also be associated with one image. In this case, the priority level of more reliable dust correction data among a plurality of dust correction data is increased to perform dust correction, and high-reliability dust correction processing can be achieved.

Second Embodiment

The second embodiment of the present invention will be described. The building components of a digital camera according to the second embodiment are the same as those in the first embodiment, and a description thereof will be omitted. Dust detection processing, shooting processing, dust correction processing, and association (first association processing) after shooting of a general image are also the same as those in the first embodiment. The second embodiment will describe a method of updating the association using the shooting date and time of an image as history information of a shot image, i.e., a modification to the second association processing (step S504) in the first embodiment. In other words, in the second embodiment, the operation of the second association processing is apparently the same as the flowchart shown in FIG. 5 except that a process executed in step S504 is mainly different.

The second association processing in the second embodiment will be described with reference to FIGS. 5 and 8.

FIG. 8 is a table showing an example of a shooting history recorded in a nonvolatile memory 127. In FIG. 8, dust correction data D is dust correction data acquired in step S200 of FIG. 5. In step S502 of FIG. 5, the shooting history is read out up to the date and time when the latest acquired dust correction data except for dust correction data D, i.e., dust correction data C in FIG. 8 was acquired. If there is no dust correction data acquisition history before dust correction data D, the entire shooting history before acquisition of dust correction data D is read out.

In step S503, an image to be associated is selected. In the example of FIG. 8, image 11 to image 18 can be targets of association with dust correction data D, but a time period of almost 20 days has elapsed between shooting of image 13 and that of image 14. Hence, it is determined that the dust adhesion state is highly likely to have changed between images shot before shooting of image 13 and those shot before shooting of image 14. Dust correction data D is acquired on a relatively close date and time after acquiring image 14. It is, therefore, estimated that as for the dust adhesion state of image 11 to image 13, dust information of dust correction data C is more reliable than that of dust correction data D, and as for the dust adhesion state of image 14 to image 18, dust information of dust correction data D is more reliable than that of dust correction data C. That is, as for image 14 to image 18, it is considered that dust correction can be done more effectively using the dust detection result of dust correction data D. For this reason, in the example of FIG. 8, image 14 to image 18 are selected in step S503. In step S504, it is checked that the selected images are recorded on a recording medium 126, and dust correction data associated with the recorded images is updated. In the example of FIG. 8, dust correction data C is associated with image 11 to image 18 by the first association processing (FIG. 4) until dust correction data D is acquired. When image 14 to image 18 have been recorded on the recording medium, the dust correction data associated with these images is updated from dust correction data C to dust correction data D.

In this fashion, a shot image is associated with dust correction data predicted to have a higher correction effect in accordance with the shooting date & time information of a shot image. Dust correction can be performed at high precision without forcing the user of the image capturing apparatus to perform a troublesome operation of selecting dust correction data to be applied to a shot image. Even if dust correction data is acquired after image shooting, high-precision dust correction can be achieved.

Third Embodiment

The third embodiment of the present invention will be described. The building components of a digital camera according to the third embodiment are the same as those in the first embodiment, and a description thereof will be omitted. Dust detection processing, shooting processing, dust correction processing, and association (first association processing) after shooting of a general image are also the same as those in the first embodiment. The third embodiment will describe a method of identifying the type of photographing lens used in image shooting as history information of a shot image, and updating the association, i.e., a modification to the second association processing (step S504) in the first embodiment. In other words, in the third embodiment, the operation of the second association processing is apparently the same as the flowchart shown in FIG. 5 except that a process executed in step S504 is mainly different.

The second association processing in the third embodiment will be described with reference to FIGS. 5 and 9.

FIG. 9 is a table showing an example of a shooting history recorded in a nonvolatile memory 127. In FIG. 9, dust correction data F is dust correction data acquired in step S200 of FIG. 5. In step S502 of FIG. 5, the shooting history is read out up to the date and time when the latest acquired dust correction data except for dust correction data F, i.e., dust correction data E in FIG. 9 was acquired. If there is no dust correction data acquisition history before dust correction data F, the entire shooting history before acquisition of dust correction data F is read out.

In step S503, an image to be associated is selected. In the example of FIG. 9, image 21 to image 28 can be targets of association with dust correction data F, but the lens used in shooting has changed between shooting of image 23 and that of image 24, i.e., the lens has been interchanged. In a lens-interchangeable image capturing apparatus, dust may enter from outside the image capturing apparatus and adhere to an optical element 104 at the time of lens interchange. That is, it is determined that the dust adhesion state is highly likely to have changed between images shot before shooting of image 23 and those shot before shooting of image 24. Dust correction data F is acquired without interchanging the lens after acquiring image 24. Thus, it is estimated that as for the dust adhesion state of image 21 to image 23, dust information of dust correction data E is more reliable than that of dust correction data F, and as for the dust adhesion state of image 24 to image 28, dust information of dust correction data F is more reliable than that of dust correction data E. That is, as for image 24 to image 28, it is considered that dust correction can be done more effectively using the dust detection result of dust correction data F. For this reason, in the example of FIG. 9, image 24 to image 28 are selected in step S503. In step S504, it is checked that the selected images are recorded on a recording medium 126, and dust correction data associated with the recorded images is updated. In the example of FIG. 9, dust correction data E is associated with image 21 to image 28 by the first association processing (FIG. 4) until dust correction data F is acquired. When image 24 to image 28 have been recorded on the recording medium, the dust correction data associated with these images is updated from dust correction data E to dust correction data F.

As described above, a shot image is associated with dust correction data predicted to have a higher correction effect in accordance with the type of lens used in shooting. Dust correction can be performed at high precision without forcing the user of the image capturing apparatus to perform a troublesome operation of selecting dust correction data to be applied to a shot image. Even if dust correction data is acquired after image shooting, high-precision dust correction can be achieved.

Other Embodiments

In the above embodiments, the processing is done using, as the operation history of the image capturing apparatus, the execution history of dust removal processing, the image data acquisition date and time, or the history of a mounted lens. However, history information for use is not limited to one, and these pieces of history information may also be properly combined and used for determination.

The object of the embodiments is also achieved by the following method. More specifically, a storage medium (or recording medium) which stores the program codes of software for implementing the functions of the above-described embodiments is supplied to a system or apparatus. The computer (or the CPU or MPU) of the system or apparatus reads out and executes the program codes stored in the storage medium. In this case, the program codes read out from the storage medium implement the functions of the above-described embodiments, and the storage medium which stores the program codes constitutes the present invention. The functions of the above-described embodiments are implemented when the computer executes the readout program codes. Also, the present invention includes a case where an OS (Operating System) or the like running on the computer performs part or all of actual processing on the basis of the instructions of the program codes and thereby implements the functions of the above-described embodiments.

Further, the present invention includes the following case. More specifically, the program codes read out from the storage medium are written in the memory of a function expansion card inserted into the computer or the memory of a function expansion unit connected to the computer. Then, the CPU of the function expansion card or function expansion unit performs part or all of actual processing on the basis of the instructions of the program codes, thereby implementing the functions of the above-described embodiments.

When the present invention is applied to the storage medium, the storage medium stores program codes corresponding to the above-described sequences.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-192650, filed Jul. 24, 2007, which is hereby incorporated by reference herein in its entirety.

The invention claimed is:

1. An image capturing apparatus comprising:
an image capturing unit, which photo-electrically converts, by an image sensor, an object image formed by a photographing lens to generate an image signal;
a foreign substance information detection unit, which detects, based on the image signal, foreign substance information serving as information on at least a position of a foreign substance adhering to an optical element placed in front of the image sensor;
an association unit, which associates the foreign substance information detected by the foreign substance information detection unit with the image signal generated by the image capturing unit; and
a foreign substance removal unit, which removes a foreign substance adhering to the optical element,
wherein the association unit associates foreign substance information with an image signal obtained after detecting the foreign substance information, and
wherein the association unit also associates the foreign substance information with an image signal obtained after a foreign substance removal operation by the foreign substance removal unit is executed and before the foreign substance information is detected.

2. An image capturing apparatus comprising:
an image capturing unit, which photo-electrically converts, by an image sensor, an object image formed by a photographing lens to generate an image signal;
a foreign substance information detection unit, which detects, based on the image signal, foreign substance information serving as information on at least a position of a foreign substance adhering to an optical element placed in front of the image sensor; and
an association unit, which associates the foreign substance information detected by the foreign substance information detection unit with the image signal generated by the image capturing unit,
wherein the association unit associates foreign substance information with an image signal obtained after detecting the foreign substance information, and
wherein the association unit also associates the foreign substance information with an image signal obtained after a detaching/attaching operation of the photographing lens mounted in the image capturing apparatus is executed and before the foreign substance information is detected.

3. A method of controlling an image capturing apparatus having an image sensor for photo-electrically converting an object image, the method comprising:
an image capturing step of photo-electrically converting, by the image sensor, an object image formed by a photographing lens to generate an image signal;
a foreign substance information detection step of detecting, based on the image signal, foreign substance information serving as information on at least a position of a foreign substance adhering to an optical element placed in front of the image sensor;
an association step of associating the foreign substance information detected in the foreign substance information detection step with the image signal generated in the image capturing step, and
a foreign substance removal step of removing a foreign substance adhering to the optical element,
wherein, in the association step, foreign substance information is associated with an image signal obtained after detecting the foreign substance information, and
wherein, in the association step, the foreign substance information also is associated with an image signal obtained after a foreign substance removal operation by the foreign substance removal step and before the foreign substance information is detected.

4. A non-transitory computer-readable storage medium storing a computer program that, when executed, causes a computer to perform a control method for controlling an image capturing apparatus having an image sensor for photo-electrically converting an object image, wherein the method includes:
an image capturing step of photo-electrically converting, by the image sensor, an object image formed by a photographing lens to generate an image signal;
a foreign substance information detection step of detecting, based on the image signal, foreign substance information serving as information on at least a position of a foreign substance adhering to an optical element placed in front of the image sensor;
an association step of associating the foreign substance information detected in the foreign substance information detection step with the image signal generated in the image capturing step, and
a foreign substance removal step of removing a foreign substance adhering to the optical element,
wherein, in the association step, foreign substance information is associated with an image signal obtained after detecting the foreign substance information, and
wherein, in the association step, the foreign substance information also is associated with an image signal obtained after a foreign substance removal operation by the foreign substance removal step and before the foreign substance information is detected.

5. A method of controlling an image capturing apparatus having an image sensor for photo-electrically converting an object image, the method comprising:
an image capturing step of photo-electrically converting, by the image sensor, an object image formed by a photographing lens to generate an image signal; and an association step of associating foreign substance information with the image signal generated in the image capturing step, wherein, in the association step, the foreign substance information is associated with an image signal obtained after detection of the foreign substance information, and wherein, in the association step, the foreign substance information is associated with an image signal obtained after a detaching/attaching operation of the photographing lens mounted in the image capturing apparatus is executed and before detection of the foreign substance information.

6. A non-transitory computer-readable storage medium storing a computer program that, when executed, causes a computer to perform a control method of controlling an image capturing apparatus having an image sensor for photo-electrically converting an object image, wherein the method includes:

an image capturing step of photo-electrically converting, by the image sensor, an object image formed by a photographing lens to generate an image signal; and an association step of associating foreign substance information with the image signal generated in the image capturing step, wherein, in the association step, the foreign substance information is associated with an image signal obtained after detection of the foreign substance information, and wherein, in the association step, the foreign substance information is associated with an image signal obtained after a detaching/attaching operation of the photographing lens mounted in the image capturing apparatus is executed and before detection of the foreign substance information.

* * * * *